(12) United States Patent
Womack

(10) Patent No.: US 7,873,906 B2
(45) Date of Patent: Jan. 18, 2011

(54) METHOD AND SYSTEM FOR PRESENTING A VISUAL NOTIFICATION AND DELAYING AN ACTION RESPONSIVE TO AN ONSCREEN SELECTION

(75) Inventor: Nathan P. Womack, Lafayette, CO (US)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 11/766,862

(22) Filed: Jun. 22, 2007

(65) Prior Publication Data

US 2008/0320394 A1 Dec. 25, 2008

(51) Int. Cl.
*G06F 3/00* (2006.01)
*G06Q 30/00* (2006.01)

(52) U.S. Cl. ............ 715/730; 715/732; 715/856; 715/860; 705/14.73

(58) Field of Classification Search ........... 715/859, 715/860, 861, 738, 741, 772, 732, 856; 725/34; 705/14.4, 14.49, 14.66, 14.73
See application file for complete search history.

(56) References Cited

U.S. PATENT DOCUMENTS

| | | | | |
|---|---|---|---|---|
| 5,699,534 | A * | 12/1997 | Barber et al. ............ | 715/856 |
| 6,097,390 | A * | 8/2000 | Marks .................... | 715/772 |
| 6,337,699 | B1 | 1/2002 | Nielsen | |
| 6,595,781 | B2 | 7/2003 | Sutton | |
| 6,652,287 | B1 | 11/2003 | Strub et al. | |
| 6,809,720 | B2 * | 10/2004 | Malamud et al. ........ | 345/157 |
| 7,170,497 | B2 | 1/2007 | Husgafvel et al. | |
| 2001/0021915 | A1 * | 9/2001 | Cohen et al. ........... | 705/14 |
| 2002/0002568 | A1 * | 1/2002 | Judson .................. | 707/513 |
| 2005/0088410 | A1 * | 4/2005 | Chaudhri ............... | 345/157 |
| 2005/0091614 | A1 * | 4/2005 | Wasko et al. ........... | 715/861 |
| 2007/0011258 | A1 * | 1/2007 | Khoo .................... | 709/206 |
| 2007/0016311 | A1 | 1/2007 | Bergman et al. | |
| 2007/0106956 | A1 * | 5/2007 | Platt et al. ............. | 715/808 |
| 2007/0156723 | A1 * | 7/2007 | Vaananen .............. | 707/100 |

OTHER PUBLICATIONS

Mouse-Cursor Desktop Location Recognition Upon Keystroke Activation; IBM Technical Disclosure Bulletin, vol. 36, Pub. No. 8; Aug. 1993; 1 page.
Deniz, et al; Pedagogically Enhance Video-on Demand Based Learning System; IEEE 2004; pp. 415-420.

\* cited by examiner

*Primary Examiner*—Tadesse Hailu
*Assistant Examiner*—Haoshian Shih
(74) *Attorney, Agent, or Firm*—Schmeiser, Olsen & Watts; Arthur J. Samodovitz

(57) ABSTRACT

A method and system for presenting a visual notification and delaying an action responsive to an onscreen selection. A computing unit displays a presentation of a software application or a web page including a selectable item. The computing unit receives a position of the cursor and a selection of the selectable item. A pre-defined delay is initiated responsive to receiving the selection. A visual notification is presented onscreen to the audience responsive to the initiation of the delay. Presenting the visual notification facilitates detecting the cursor at the received position by the audience and indicates that an action responsive to the selection is to be executed. The delay is determined to be completed. The action is executed responsive to determining the completion of the delay.

20 Claims, 9 Drawing Sheets

METHOD AND SYSTEM FOR PRESENTING A VISUAL NOTIFICATION AND DELAYING AN ACTION RESPONSIVE TO AN ONSCREEN SELECTION

FIELD OF THE INVENTION

The present invention relates to a method and system for presenting a visual notification and delaying an action responsive to an onscreen selection, and more particularly to a technique for changing the presentation of a cursor and/or displaying one or more additional graphic elements while delaying an upcoming action responsive to a click of a pointing device.

BACKGROUND OF THE INVENTION

In a conventional computer-based demonstration of a software application or an internet website, a presenter utilizes a pointing device to point a cursor and click a link, menu bar option, button or other selectable screen item to navigate through electronic pages of the software application or the internet website as participants in an audience view the demonstration. Due to the current speed of computing units, pages change or are updated during a demonstration within a few seconds or within a fraction of a second. Because of the participants' physical movements (e.g., eyes blinking), their desire to take notes, or a momentary distraction, one or more participants may notice a changed or updated page without having observed what link, menu bar option, button or other selectable screen item was selected on the previous page. Not observing what item was selected on the previous page decreases the understanding a participant has of the application or website being demonstrated and reduces the overall effectiveness of the demonstration. Known manual workarounds for this problem exist, as presenters stop the demonstration to announce the upcoming selection and/or manually manipulate the pointing device to cause the cursor to jiggle onscreen to attract the attention of the participants. Being manual approaches, these known workaround techniques are prone to error and inconsistent application (e.g., the presenter may jiggle the cursor for a tenth of a second one time, and three seconds the second time). Thus, there exists a need to overcome at least one of the preceding deficiencies and limitations of the related art.

SUMMARY OF THE INVENTION

In first embodiments, the present invention provides a computer-implemented method of presenting a visual notification and delaying an action responsive to an onscreen selection. The method includes, for example, the following steps performed by a computing unit: (1) displaying a presentation onscreen to an audience, where the presentation includes a selectable item, and where the presentation is an application page of a software application or a web page of a website; (2) receiving a position of a cursor and a selection of the selectable item via a pointing device coupled to the computing unit; (3) initiating a pre-defined delay time period in response to receiving the selection; (4) presenting a visual notification onscreen to the audience in response to initiating the pre-defined delay time period, where presenting the visual notification includes changing an onscreen appearance of the cursor or displaying one or more graphic elements around or substantially close to the cursor, facilitating a detection of the cursor at the position by the audience and indicating that an action responsive to the selection is to be executed; (5) determining a completion of the pre-defined delay time period; and (6) executing the action in response to determining the completion of the pre-defined delay time period.

In an alternate embodiment to the first embodiments listed above, step (4) is supplemented by presenting an audio notification to the audience in response to initiating the pre-defined delay time period, where presenting the audio notification also indicates that the action responsive to the selection is to be executed.

In second embodiments, the present invention provides a computer-implemented method of presenting advertising content and delaying an action responsive to an onscreen selection. The method includes, for example, the following steps performed by a computing unit: (1) receiving pre-defined presentation parameters, including a delay time period and N, a number of selections (i.e., clicks) performed by a user utilizing a pointing device coupled to the computing unit; (2) executing an initiation of a web session for the user; (3) displaying a web page to the user as a part of the web session, where the web page includes a selectable item; (4) receiving a position of a cursor and a selection of the selectable item via the pointing device, where an action responsive to the selection is to be executed; (5) determining the selection is an N-th selection since the initiation of the web session or an N-th selection since a previous presentation of advertising content within the web session; (6) initiating the delay time period in response to determining the N-th selection; (7) fixing the cursor in the position in response to the initiating the delay time period and optionally presenting an audio notification to the user; (8) initiating a presentation of advertising content onscreen to the user in response to initiating the delay time period; (9) determining a completion of the delay time period; (10) ending the presentation of advertising content in response to determining the completion of the delay time period; (11) releasing the cursor from being fixed in the aforementioned position in response determining the completion of the delay time period; and (12) executing the action in response to determining the completion of the delay time period.

Computer program products corresponding to the above-summarized methods are also described and claimed herein. Systems and processes for supporting computing infrastructure that provides at least one support service corresponding to the above-summarized methods are also described herein.

Advantageously, the present invention facilitates understanding a demonstration of a software application or web pages by providing a visual notification during a pre-defined time period that draws attention to the location of the cursor immediately after an onscreen selection is made and that indicates that an action responsive to the onscreen selection is forthcoming.

DETAILED DESCRIPTION OF THE INVENTION

The present invention provides a method and system for enhancing a demonstration of a page of a software application or a website by delaying the initiation of an action (e.g., requesting a subsequent page) that is associated with a cursor-initiated onscreen selection of a selectable item (e.g., link, menu option or button) included in the page. Instead of initiating the action immediately upon detecting the onscreen selection, a user-defined delay time period is initiated during which the cursor is fixed in place, a visual notification is presented to an audience viewing the demonstration, and other system activity is suspended. The visual notification draws the attention of the audience to facilitate the detection of the cursor and to indicate that the action is forthcoming. After the delay time period ends, the cursor is once again movable, the visual notification ends, and execution of the action is initiated.

Figure 1:
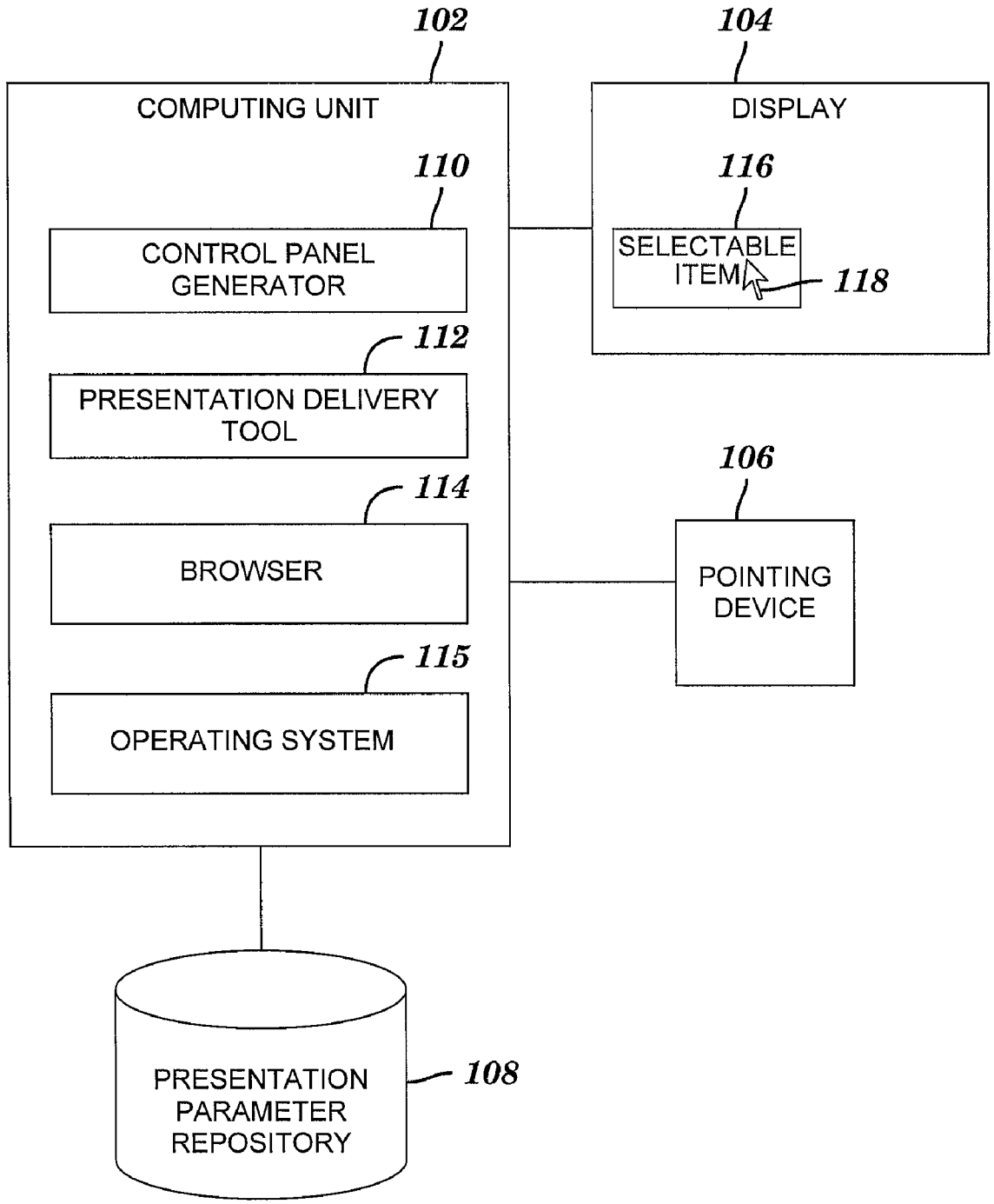
FIG. 1 is a block diagram of a system for presenting a visual notification and delaying an action responsive to an onscreen selection, in accordance with embodiments of the present invention.

FIG. 1 is a block diagram of a system for presenting a visual notification, during a delay initiated by a selection via a pointing device, of an upcoming action responsive to the selection, in accordance with embodiments of the present invention. System 100 includes a computing unit 102, a display unit 104, a pointing device 106 and a presentation parameter repository 108. Computing unit 102 includes a control panel generator 110, a presentation delivery tool 112, a web browser 114 and an operating system 115. In another embodiment, a software application is also included in computing unit 102 and may replace browser 114. Computing unit 102 is, for example, a personal computer in a standalone or networked computing environment, a client computing node or server computing node in a client-server computing environment, or a personal digital assistant (PDA).

In one embodiment, the aforementioned software application included in computing unit 102 is the application being demonstrated to an audience of participants by a presenter. In another embodiment, a website being demonstrated to an audience of participants is being navigated by a presenter who utilizes web browser 114. In still another embodiment, a demonstration utilizes both a software application and web pages and computing unit 102 therefore includes both a software application and web browser 114.

Control panel generator 110 generates a control panel for access by a user of computing unit 102. The user utilizes the control panel to define or update presentation parameters that are stored in repository 108, such as a delay time period (i.e., a period of time initiated by an onscreen selection by a click provided by a pointing device and during which an initiation of an action responsive to the onscreen selection is delayed) and a visual notification type (e.g., a blinking cursor or one or more additional graphic elements that are presented around or substantially close to the cursor and that may be presented as an animated effect). These user-defined presentation parameters and others are described below relative to FIG. 2. In one embodiment, control panel generator 110 generates presentation control panel that overrides a conventional mouse control panel or a conventional control panel for another type of pointing device.

Presentation delivery software tool 112 identifies the initiation of the delay time period during the demonstration of the software application or website in response to an onscreen selection by a pointing device (e.g., by clicking on a link, menu bar option or button with a mouse). Further, presentation delivery tool 112 presents the visual notification and optionally, an audible notification upon the identification of the initiation of the delay time period. The visual notification and the optional audible notification draw the attention of the audience to the position of the cursor on the screen and also indicate that an action responsive to the onscreen selection is upcoming.

Display 104 includes a selectable item 116 and a cursor 118. As used herein, a selectable item is defined as an onscreen element of an electronic page of a software application or website whose selection by a pointing device initiates an action. As used herein, an action is defined as a display of a new electronic page, an updated page or a document (e.g., a Portable Document Format (PDF) file). The aforementioned selection by a pointing device is performed by pointing to and clicking on the selectable item (e.g., by a left mouse click). Selectable items include, for example, hyperlinks (a.k.a. links, clickable links, or hot links), menu options, buttons, icons, navigation elements, reference elements, text labels, and graphical user interface (GUI) elements that initiate actions upon being selected by a pointing device.

Pointing device 106 is, for example, a mouse, trackball, touchpad, graphics tablet, etc. Cursor 118 is, for example, a mouse pointer.

Figure 2:
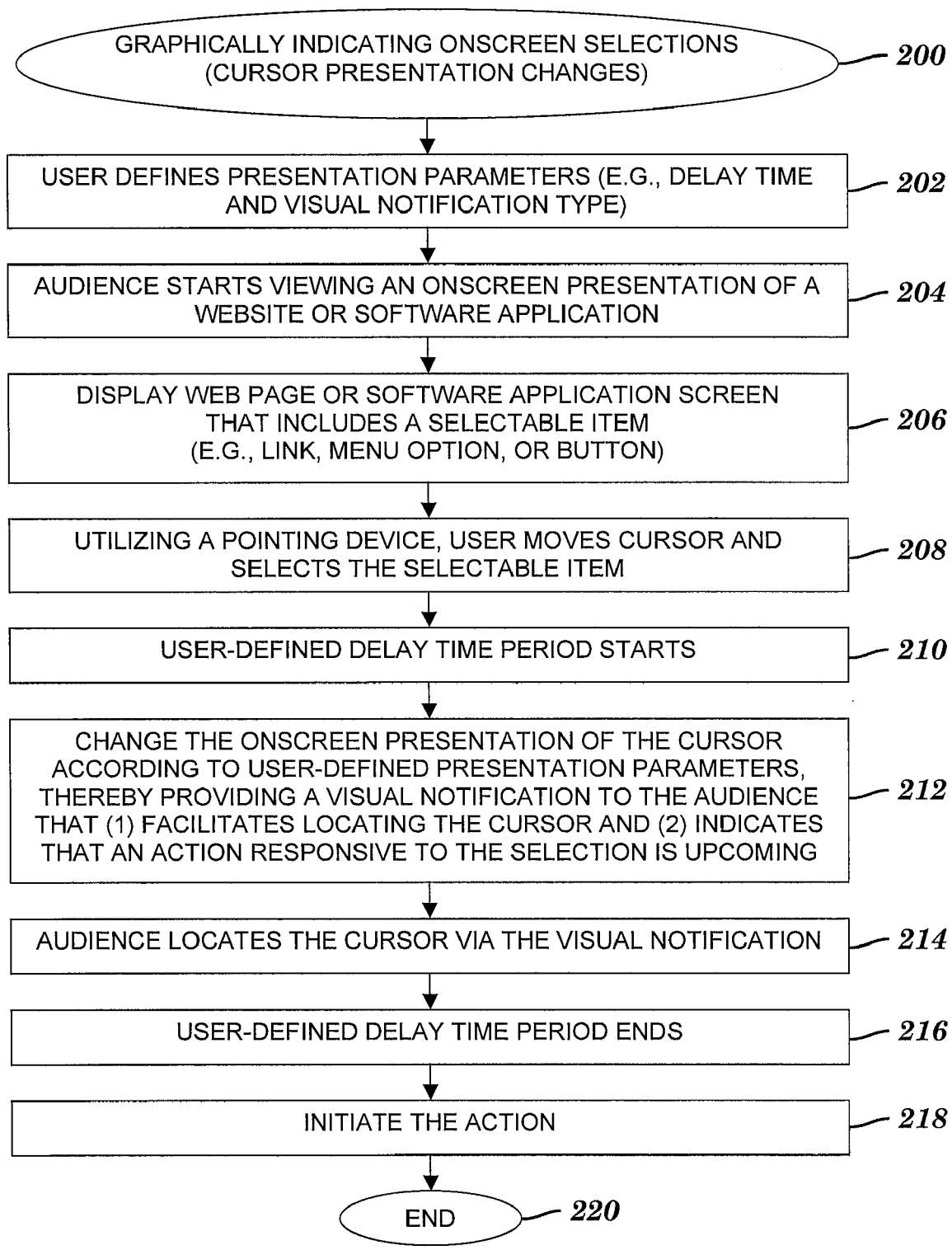
FIG. 2 is a flowchart of a process of presenting a cursor-changing visual notification and delaying an action responsive to an onscreen selection, where the process is implemented by the system of FIG. 1, in accordance with embodiments of the present invention.

FIG. 2 is a flowchart of a process of presenting a cursor-changing visual notification and delaying an action responsive to an onscreen selection, where the process is implemented by the system of FIG. 1, in accordance with embodiments of the present invention. The cursor-changing visual notification presentation process begins at step 200. In step 202, a user defines presentation parameters for a demonstration, via computing unit 102 (see FIG. 1), of a software application included in computing unit 102 (see FIG. 1) or web pages presented by browser 114 (see FIG. 1). The demonstration (e.g., a training session) is presented to an audience of participants by a presenter who controls pointing device 106 (see FIG. 1). The user in step 202 pre-defines the presentation parameters prior to the start of the demonstration of the application or web pages. The user may be the presenter of the demonstration or another user of computing unit 102 (see FIG. 1). The pre-defined presentation parameters may also be updated during the demonstration (i.e., at any point in the process of FIG. 2).

The presentation parameters defined in step 202 include a delay time period selected from a range of time periods from 0.0 seconds to n seconds (e.g., 0.0 seconds to 3.0 seconds) and a visual notification type. The delay time period parameter is a period of time initiated in response to an onscreen selection of a selectable item by a click provided by a pointing device. The visual notification specified by the visual notification type parameter is presented to the audience of the demonstration in response to the initiation of the delay time period. The visual notification type is (1) a change in the onscreen presentation of the cursor, (2) a display of one or more additional graphic elements that are presented onscreen around or substantially close to the cursor, (3) a change in the onscreen presentation of the selectable item, or (4) any combination of visual notification types (1), (2) and (3).

Figure 5:
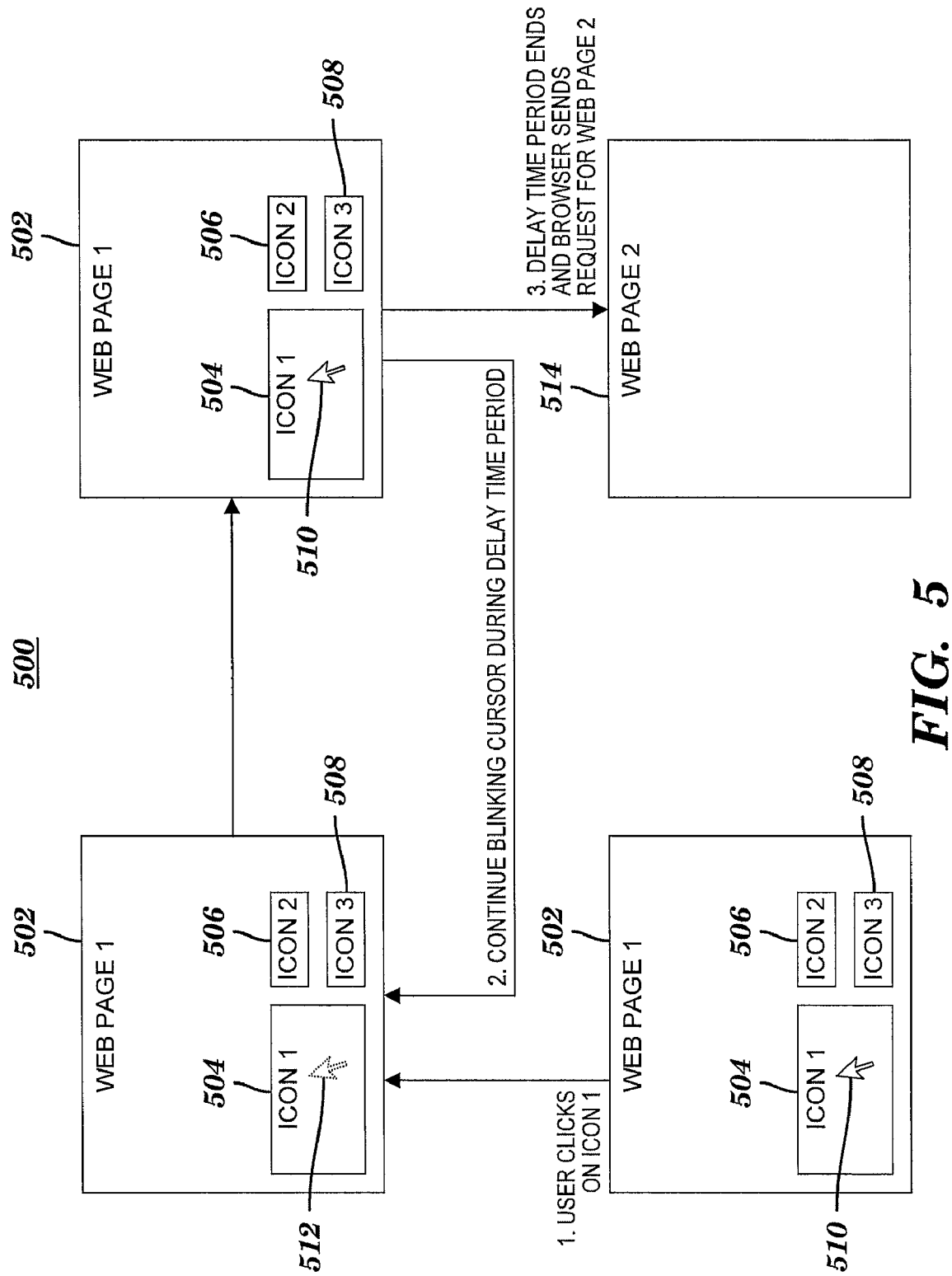
FIG. 5 is an example of a web page to which the process of FIG. 2 is applied, in accordance with embodiments of the present invention.

In step 202, the user defines the visual notification type as a change in the onscreen presentation of the cursor, which includes, for example, blinking the cursor between being visible and not visible onscreen, changing the size and/or shape of the cursor to create a pulsating or other animated effect, changing the color of the cursor to create a blinking or animated effect, changing the color and/or style of the outline of the cursor to create a blinking or animated effect, etc. Refer to FIG. 5 for one example of applying the visual notification type defined in step 202.

Other presentation parameters that are optionally defined in step 202 include: an audio notification type, the speed of blinking the cursor or changing the size, color and/or outline style of the cursor, and the cursor's changing colors, sizes, and/or outline styles. An audio notification is the audible presentation of audio data file (e.g., MP3 file) in response to the initiation of the delay time period. Defining an audio notification type in step 202 includes, for example, selecting one of a list of multiple audio data files.

The user defines presentation parameters in step 202 via a control panel that is generated by control panel generator 110 (see FIG. 1). The user responds to onscreen prompts and/or fills in onscreen data fields on the control panel to define the presentation parameters. The presentation parameters defined via the control panel are received by presentation delivery tool 112.

In step 204, the audience starts viewing the onscreen demonstration of the software application or web pages of a website. In step 206, display 104 (see FIG. 1) presents one of the software application screens or web pages that includes selectable item 116 (see FIG. 1). In step 208, the presenter uses pointing device 106 to point the cursor at selectable item 116 (see FIG. 1) and select the selectable item presented in step 206 (i.e., clicks on the selectable item). The selectable item selected in step 208 is also referred to herein as the onscreen selection. In response to selecting the selectable item in step 208, computing unit 102 (see FIG. 1) receives the selection of the selectable item and a position of the cursor on display 104 (see FIG. 1) at the time of the selection.

In step 210, presentation delivery tool 112 (see FIG. 1) initiates the pre-defined delay time period in response to computing unit 102 (see FIG. 1) receiving the selection of the selectable item in step 208. In response to the initiation of the delay time period in step 210, computing unit 102 (see FIG. 1) in step 212 fixes the cursor at the position received in step 208 and suspends system activity. Also in step 212, presentation delivery tool 112 (see FIG. 1) presents on display 104 (see FIG. 1) a visual notification of the visual notification type defined in step 202 in response to the initiation of the delay time period in step 210. That is, step 212 changes the onscreen presentation of the cursor. The presentation of the visual notification in step 212 facilitates a visual detection of the cursor on display 104 (see FIG. 1) by the audience. The visual notification presented in step 212 also indicates to the audience that an execution of an action responsive to the onscreen selection of step 208 is forthcoming. The actual execution of the action responsive to the onscreen selection is postponed for the pre-defined delay time period.

In step 214, the one or more participants in the audience locate (i.e., detect on display 104 of FIG. 1) the cursor via the visual notification presented in step 212. In step 216, presentation delivery tool 112 (see FIG. 1) determines a completion of the pre-defined delay time period. In step 218, in response to the determination of the completion of the delay time period in step 216, presentation delivery tool 112 (see FIG. 1) stops the presentation of the visual notification of step 212. Also in response to the determination of the completion of the delay time period in step 216, step 218 includes computing unit 102 (see FIG. 1) releasing the cursor from the position in which the cursor was fixed (i.e., allowing the cursor to be moved by pointing device 106 of FIG. 1) and executing the action responsive to the onscreen selection of step 208. The process of FIG. 2 ends at step 220.

Figure 3:
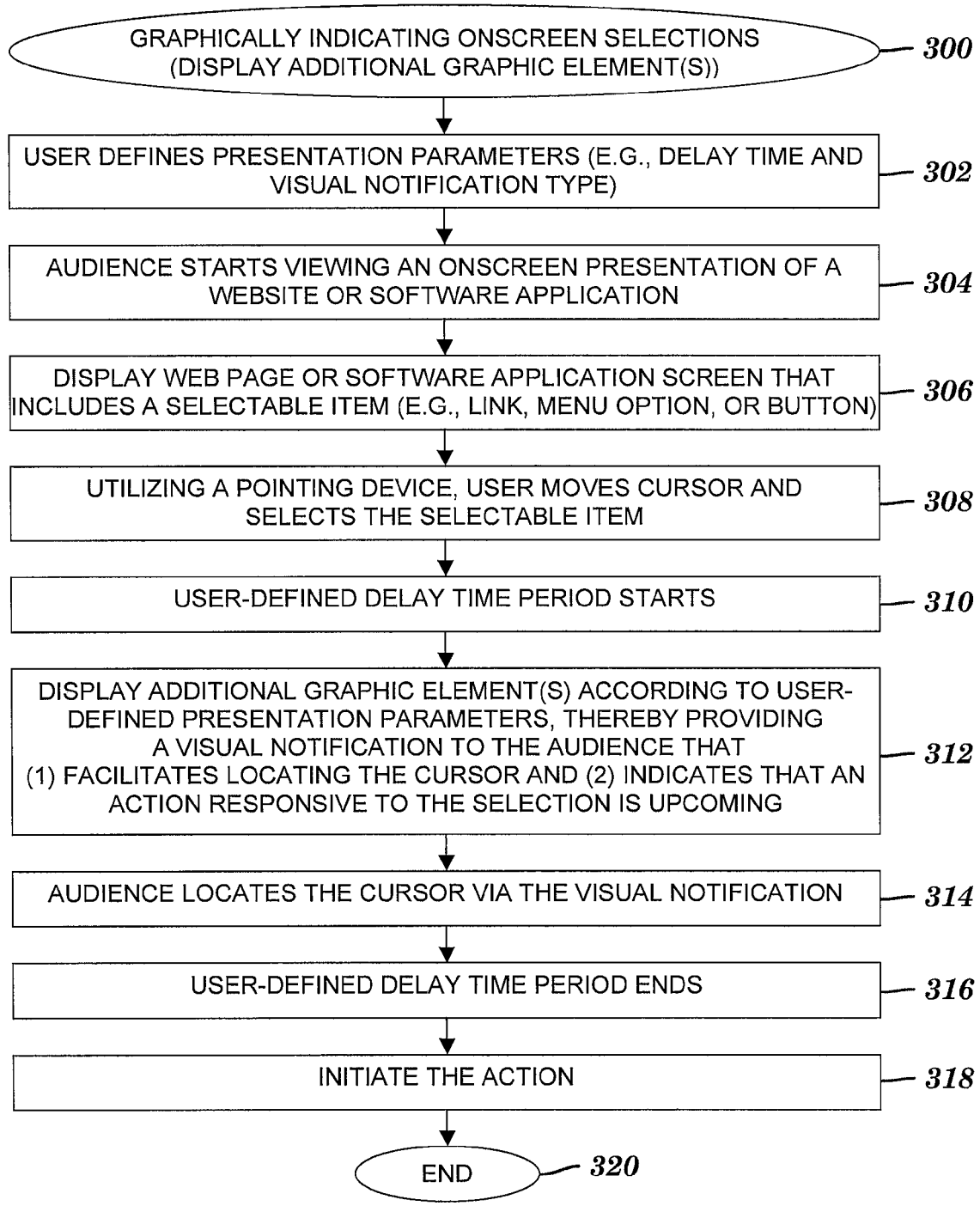
FIG. 3 is a flowchart of a process of presenting a visual notification including one or more graphical elements associated with a cursor and delaying an action responsive to an onscreen selection, where the process is implemented by the system of FIG. 1, in accordance with embodiments of the present invention.

FIG. 3 is a flowchart of a process of presenting a visual notification including one or more graphical elements associated with a cursor and delaying an action responsive to an onscreen selection, where the process is implemented by the system of FIG. 1, in accordance with embodiments of the present invention. The visual notification process of FIG. 3 starts at step 300. Step 302 includes the user defining presentation parameters as described above relative to step 202 of FIG. 2, except that in step 302, the user defines the visual notification type that displays one or more additional graphic elements that are presented around or substantially close to the cursor on display 104 (see FIG. 1) to create an animated effect. The one or more additional graphic elements are in addition to the onscreen items already included in the demonstration.

Figure 6:
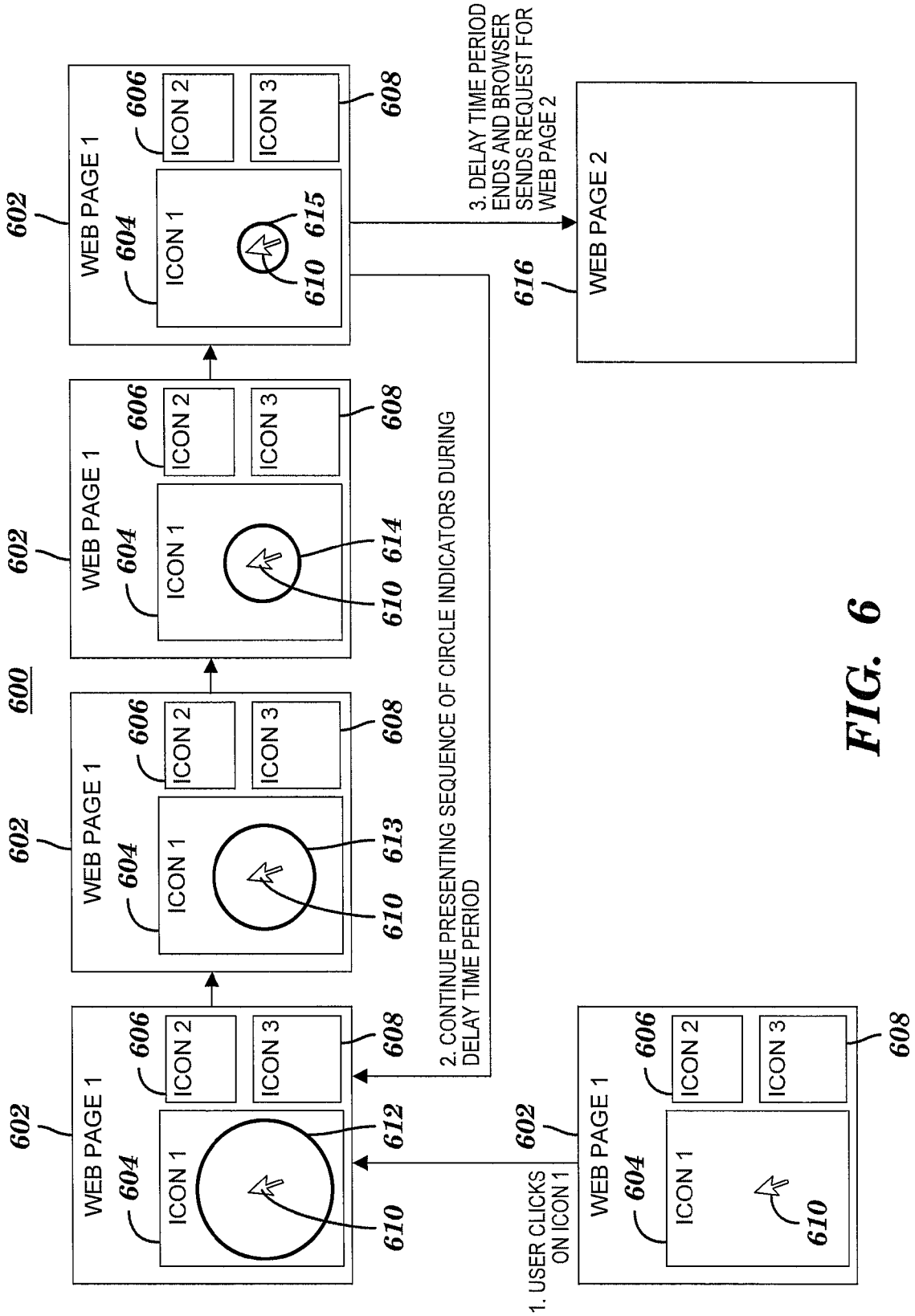
FIG. 6 is an example of a web page to which the process of FIG. 3 is applied, in accordance with embodiments of the present invention.

Applying the visual notification type defined in step 302 includes, for instance, repeatedly presenting a series of rings centered around the cursor (e.g., around a pre-specified point of the cursor), where the rings have decreasing diameter sizes in the series and are presented one at a time to depict a convergence towards the cursor. Refer to FIG. 6 for one example of the aforementioned repeated presentation of a series of rings around the cursor.

Other presentation parameters that are optionally defined in step 302 include an audio notification type (as described above relative to step 202 of FIG. 2) and the speed of the animated effect generated by the one or more graphic elements.

The user defines presentation parameters in step 302 via a control panel that is generated by control panel generator 110 (see FIG. 1).

Steps 304, 306, 308 and 310 are identical to steps 204, 206, 208 and 210 of FIG. 2. In response to the initiation of the delay time period in step 310, computing unit 102 (see FIG. 1) in step 312 fixes the cursor at the position received in step 308 and suspends system activity. Also in step 312, presentation delivery tool 112 (see FIG. 1) presents on display 104 (see FIG. 1) a visual notification of the visual notification type defined in step 302 in response to the initiation of the delay time period in step 310. That is, step 312 displays one or more additional graphic elements around or substantially close to the cursor. The presentation of the visual notification in step 312 facilitates a visual detection of the cursor on display 104 (see FIG. 1) by the audience. The visual notification presented in step 312 also indicates to the audience that an execution of an action responsive to the onscreen selection of step 308 is forthcoming. The actual execution of the action responsive to the onscreen selection is postponed for the pre-defined delay time period.

In step 314, the one or more participants in the audience locate (i.e., detect on display 104 of FIG. 1) the cursor via the visual notification presented in step 312. In step 316, presentation delivery tool 112 (see FIG. 1) determines a completion of the pre-defined delay time period. In step 318, in response to the determination of the completion of the delay time period in step 316, presentation delivery tool 112 (see FIG. 1) stops the presentation of the visual notification of step 312. Also in response to the determination of the completion of the delay time period in step 316, step 318 includes computing unit 102 (see FIG. 1) releasing the cursor from the position in which the cursor was fixed (i.e., allowing the cursor to be moved by pointing device 106 of FIG. 1) and executing the action responsive to the onscreen selection of step 308. The process of FIG. 3 ends at step 320.

Figure 4:
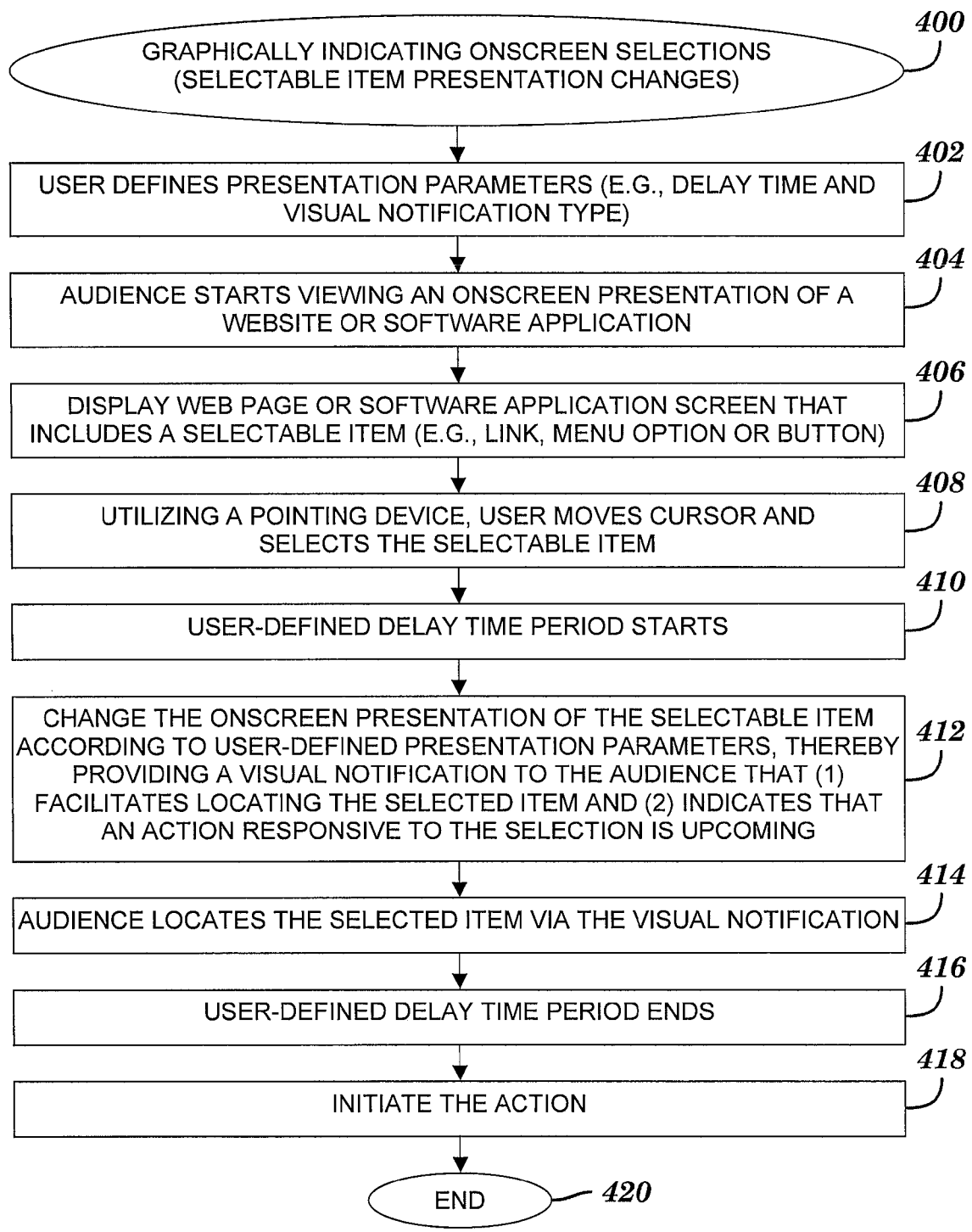
FIG. 4 is a flowchart of a process of presenting a visual notification including a change of a presentation of a selectable item and delaying an action responsive to an onscreen selection of the selectable item, where the process is implemented by the system of FIG. 1, in accordance with embodiments of the present invention.

FIG. 4 is a flowchart of a process of presenting a visual notification including a change of a presentation of a selectable item and delaying an action responsive to an onscreen selection of the selectable item, where the process is implemented by the system of FIG. 1, in accordance with embodiments of the present invention. The visual notification process of FIG. 4 starts at step 400. Step 402 includes the user defining presentation parameters as described above relative to step 202 of FIG. 2, except that in step 402, the user defines the visual notification type that changes the presentation of the selectable item on display 104 (see FIG. 1).

Figure 7:
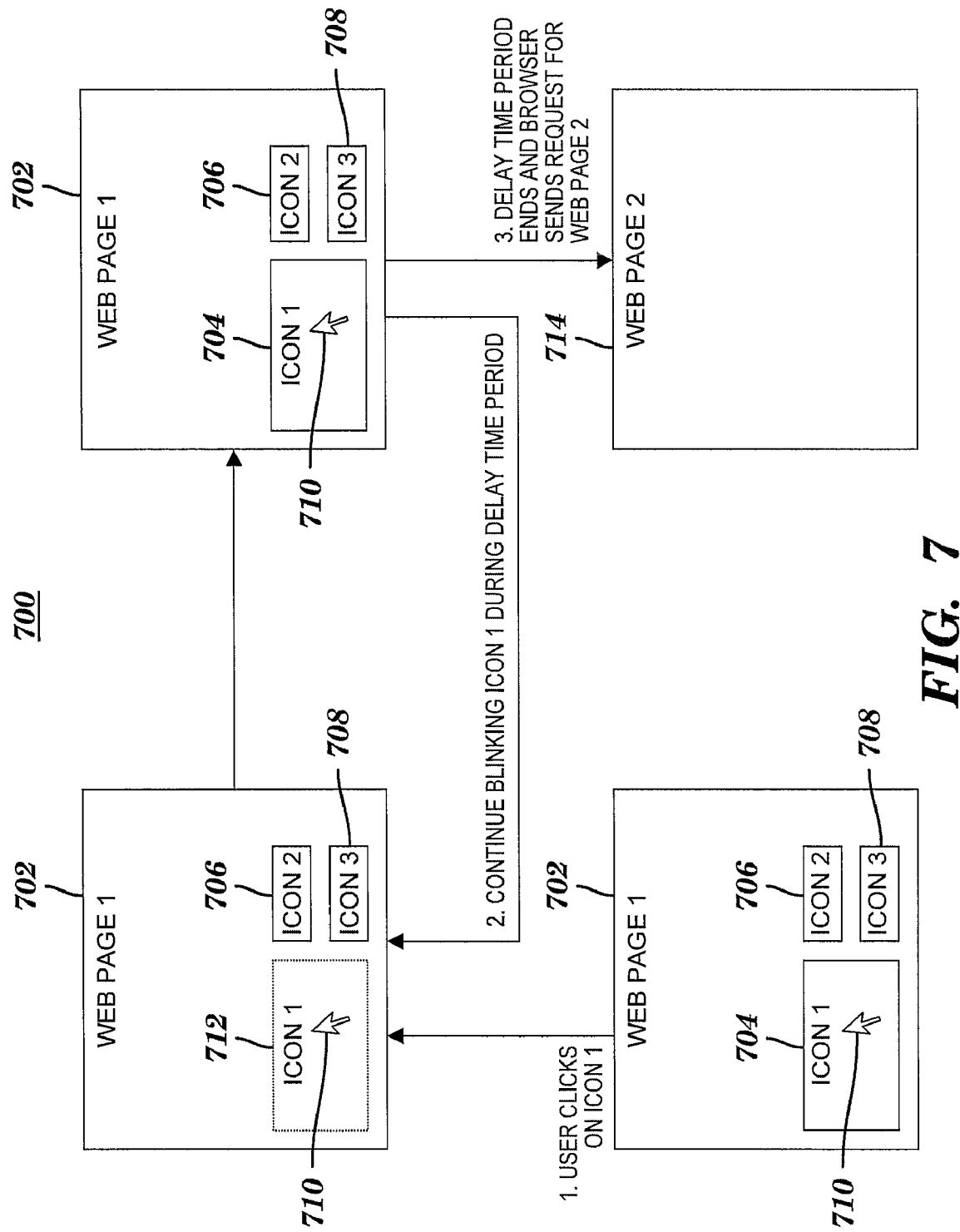
FIG. 7 is an example of a web page to which the process of FIG. 4 is applied, in accordance with embodiments of the present invention.

Applying the visual notification type defined in step 402 includes, for instance, blinking the selectable item from being visible to being not visible onscreen, changing the color of the selectable item, changing the style of the outline of the selectable item, etc. Refer to FIG. 7 for one example of the visual notification type defined in step 402.

Other presentation parameters that are optionally defined in step 402 include an audio notification type (as described above relative to step 202 of FIG. 2), the speed of blinking the selectable item or the speed of changing the color and/or outline style of the selectable item, and the selectable item's changing colors and/or outline styles.

The user defines presentation parameters in step 402 via a control panel that is generated by control panel generator 110 (see FIG. 1).

Steps 404, 406, 408 and 410 are identical to steps 204, 206, 208 and 210 of FIG. 2. In response to the initiation of the delay time period in step 410, computing unit 102 (see FIG. 1) in step 412 fixes the cursor at the position received in step 408 and suspends system activity. Also in step 412, presentation delivery tool 112 (see FIG. 1) presents on display 104 (see FIG. 1) a visual notification of the visual notification type defined in step 402 in response to the initiation of the delay time period in step 410. That is, step 412 changes the onscreen presentation of the selectable item. The presentation of the visual notification in step 412 facilitates a visual detection of the selectable item and the cursor on display 104 (see FIG. 1) by the audience. The visual notification presented in step 412 also indicates to the audience that an execution of an action responsive to the onscreen selection of step 408 is forthcoming. The actual execution of the action responsive to the onscreen selection is postponed for the pre-defined delay time period.

In step 414, one or more participants in the audience locate (i.e., detect on display 104 of FIG. 1) the selectable item and the cursor via the visual notification presented in step 412. In step 416, presentation delivery tool 112 (see FIG. 1) determines a completion of the pre-defined delay time period. In step 418, in response to the determination of the completion of the delay time period in step 416, presentation delivery tool 112 (see FIG. 1) stops the presentation of the visual notification of step 412. Also in response to the determination of the completion of the delay time period in step 416, step 418 includes computing unit 102 (see FIG. 1) releasing the cursor from the position in which the cursor was fixed (i.e., allowing the cursor to be moved by pointing device 106 of FIG. 1) and executing the action responsive to the onscreen selection of step 408. The process of FIG. 4 ends at step 420.

Examples

FIG. 5 is an example of a web page to which the process of FIG. 2 is applied, in accordance with embodiments of the present invention. Example 500 includes a first web page 502 being presented in step 206 (see FIG. 2) to an audience via display 104 (see FIG. 1). The initial display of web page 502 is shown in the lower left corner of example 500. Web page 502 includes icons 504, 506 and 508, which are selectable items. A cursor in an initial visible state 510 is positioned over icon 504. The user clicks on icon 504 by performing a left mouse click in step 208 (see FIG. 2). The delay time period specified in step 202 (see FIG. 2) starts in step 210 (see FIG. 2), thereby postponing a presentation of a second web page 514 associated with clicking on icon 504.

Step 212 (see FIG. 2) starts with display 104 (see FIG. 1) presenting web page 502 as shown in the upper left corner of example 500 with the cursor changed to a blinked off state 512. Display 104 (see FIG. 1) then presents web page 502 as shown in the upper right corner of example 500 with the cursor blinked back on to its initial state 510. This blinking of the cursor (i.e., changing back and forth between states 512 and 510) continues for the extent of the delay time period, thereby drawing the attention of the audience to the location of the cursor and indicating the upcoming action of displaying second web page 514 associated with clicking on icon 504. Upon a determination by computing unit 102 (see FIG. 1) that the delay time period has ended in step 216 (see FIG. 2), browser 114 (see FIG. 1) sends a request for second web page 514 in step 218 (see FIG. 2).

FIG. 6 is an example of a web page to which the process of FIG. 3 is applied, in accordance with embodiments of the present invention. Example 600 includes a first web page 602 being presented in step 306 (see FIG. 3) to an audience via display 104 (see FIG. 1). The initial display of web page 602 is shown in the lower left corner of example 600. Web page 602 includes icons 604, 606 and 608, which are selectable items. A cursor 610 is positioned over icon 604. The user clicks on icon 604 by performing a left mouse click in step 308 (see FIG. 3). The delay time period specified in step 302 (see FIG. 3) starts in step 310 (see FIG. 3), thereby postponing a presentation of a second web page 616 associated with clicking on icon 604.

Step 312 (see FIG. 3) starts with display 104 (see FIG. 1) presenting web page 602 as shown in the upper left corner of example 600, and in which the cursor is encircled by circle 612, the first of a series of four additional graphic indicator elements (i.e., graphic elements not included in the presentation of web page 602 prior to the user clicking on icon 604). Display 104 (see FIG. 1) then presents web page 602 with the cursor encircled by circle 613, the second of the series of additional graphic elements, and whose diameter is smaller than the diameter of circle 612. Display 104 (see FIG. 1) then presents web page 602 with the cursor encircled by circle 614, the third in the series of additional graphic elements, and whose diameter is smaller than the diameter of circle 613. Display 104 (see FIG. 1) then presents web page 602 with the cursor encircled by circle 615, the fourth in the series of four additional graphic elements, and whose diameter is smaller than the diameter of circle 614. The animated effect created by displaying circles 612-615 in succession continues for the extent of the delay time period, thereby drawing the attention of the audience to the location of the cursor and indicating the upcoming action of displaying second web page 616 associated with clicking on icon 604. Upon a determination by computing unit 102 (see FIG. 1) that the delay time period has ended in step 316 (see FIG. 3), browser 114 (see FIG. 1) sends a request for second web page 616 in step 318 (see FIG. 3).

FIG. 7 is an example of a web page to which the process of FIG. 4 is applied, in accordance with embodiments of the present invention. Example 700 includes a first web page 702 being presented in step 406 (see FIG. 4) to an audience via display 104 (see FIG. 1). The initial display of web page 702 is shown in the lower left corner of example 700. Web page 702 includes icons 704, 706 and 708, which are selectable items. A cursor 710 is positioned over icon 704, which is displayed in its initial state in the lower left corner of example 700. The user clicks on icon 704 by performing a left mouse click in step 408 (see FIG. 4). The delay time period specified in step 402 (see FIG. 4) starts in step 410 (see FIG. 4), thereby postponing a presentation of a second web page 714 associated with clicking on icon 704.

Step 412 (see FIG. 4) starts with display 104 (see FIG. 1) presenting web page 702 as shown in the upper left corner of example 700 with the icon selected in step 408 (see FIG. 4) changed to a blinked off state 712. Display 104 (see FIG. 1) then presents web page 702 as shown in the upper right corner of example 700 with the selected icon blinked back on to its initial state 704. This blinking of the icon selected in step 408 (see FIG. 4) (i.e., changing back and forth between states 712 and 704) continues for the extent of the delay time period, thereby drawing the attention of the audience to the location of the selected icon (i.e., icon 704) and the location of cursor 710, and indicating the upcoming action of displaying second web page 714 associated with clicking on icon 704. Upon a determination by computing unit 102 (see FIG. 1) that the delay time period has ended in step 416 (see FIG. 3), browser 114 (see FIG. 1) sends a request for second web page 714 in step 418 (see FIG. 4).

Computing System

Figure 8:
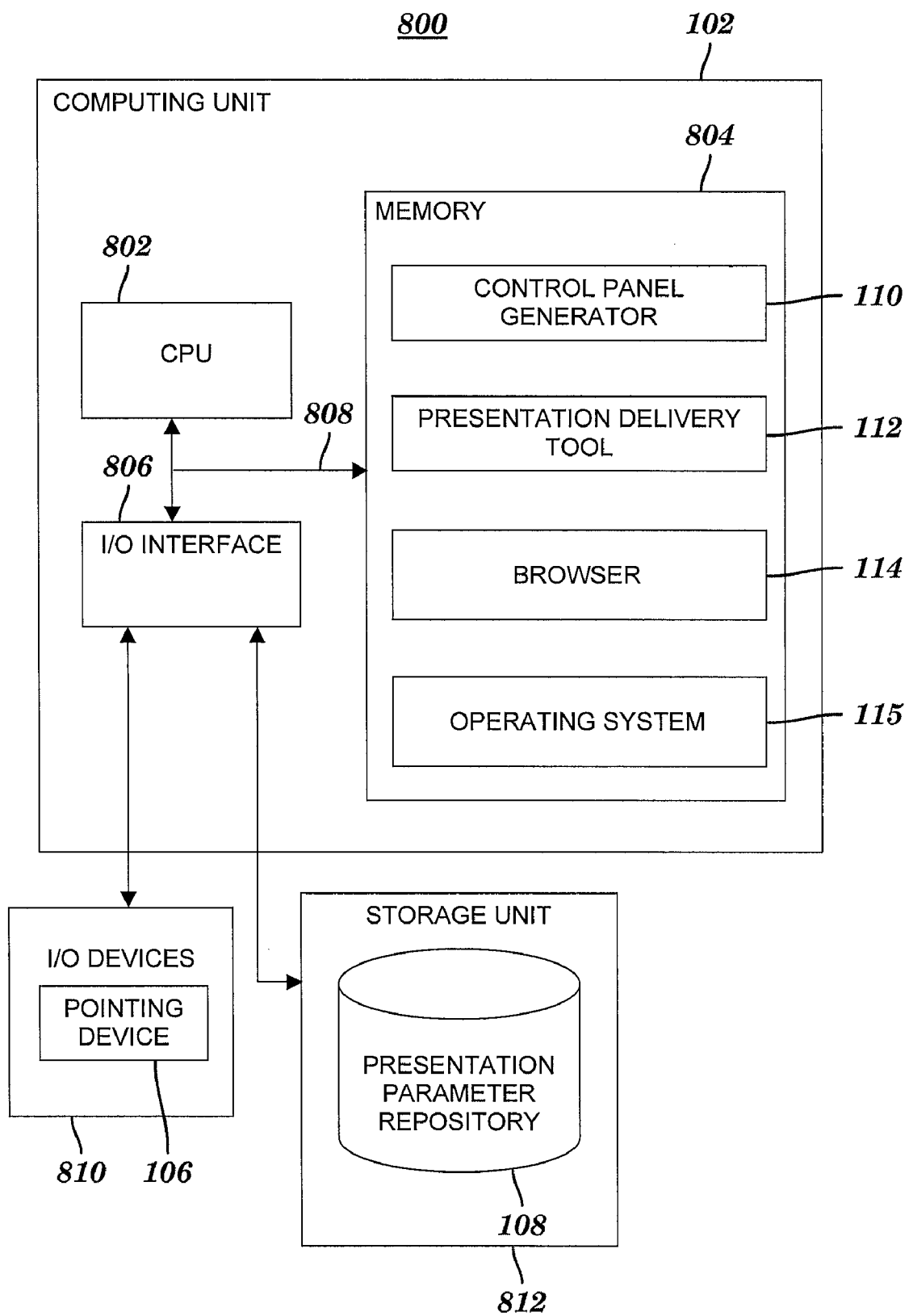
FIG. 8 is a block diagram of a computing system that includes a computing unit of FIG. 1 and that implements the process of FIG. 2, 3 or 4, in accordance with embodiments of the present invention.

FIG. 8 is a block diagram of a computing system 800 that includes a computing unit 102 of FIG. 1 and that implements the process of FIG. 2, 3 or 4, in accordance with embodiments of the present invention. Computing unit 102 generally comprises a central processing unit (CPU) 802, a memory 804, an input/output (I/O) interface 806, a bus 808, I/O devices 810 and a storage unit 812. CPU 802 performs computation and control functions of computing unit 102. CPU 802 may comprise a single processing unit, or be distributed across one or more processing units in one or more locations (e.g., on a client and server).

Memory 804 may comprise any known type of data storage and/or transmission media, including bulk storage, magnetic media, optical media, random access memory (RAM), read-only memory (ROM), a data cache, a data object, etc. Cache memory elements of memory 804 provide temporary storage of at least some program code (e.g., presentation delivery tool 112) in order to reduce the number of times code must be retrieved from bulk storage during execution. Moreover, similar to CPU 802, memory 804 may reside at a single physical location, comprising one or more types of data storage, or be distributed across a plurality of physical systems in various forms (e.g., Network Attached Storage (NAS), Storage Area Networks (SANs), external drives, etc.). Further, memory 804 can include data distributed across, for example, a LAN, WAN or SAN (not shown).

I/O interface 806 comprises any system for exchanging information to or from an external source. I/O devices 810 comprise any known type of external device, including a pointing device 106 (e.g., a mouse), a display monitor, keyboard, printer, speakers, handheld device, facsimile, network device (e.g., hub, router, or switch), etc. Bus 808 provides a communication link between each of the components in computing unit 102, and may comprise any type of transmission link, including electrical, optical, wireless, etc.

I/O interface 806 also allows computing unit 102 to store and retrieve information (e.g., program instructions or data) from an auxiliary storage device 812. Storage device 812 includes the presentation parameter repository 108. The auxiliary storage device may be a non-volatile storage device such as a magnetic disk drive or an optical disk drive (e.g., a CD-ROM drive which receives a CD-ROM disk). Computing unit 102 can store and retrieve information from other auxiliary storage devices (not shown), which can include a direct access storage device (DASD) (e.g., hard disk or floppy diskette), a magneto-optical disk drive, a tape drive, or a wireless communication device.

Memory 804 includes programs for control panel generator 110, presentation delivery tool 112 and browser 114, whose functionalities are described above relative to FIG. 1. In another embodiment, browser 114 is replaced or supplemented by a software application. The aforementioned programs in memory 804 implement the steps of the processes of FIGS. 2, 3 and 4. Further, memory 804 includes an operating system 115 (e.g., Linux) that runs on CPU 802 and provides control of various components within and/or connected to computing unit 102. Other systems not shown in FIG. 8 may also be included in memory 804.

The invention, including presentation delivery tool 112, can take the form of an entirely hardware embodiment, an entirely software embodiment or an embodiment containing both hardware and software elements. In a preferred embodiment, the presentation delivery tool 112 is implemented in software, which includes but is not limited to firmware, resident software, microcode, etc., and which can be loaded into computing unit 102 from a computer-readable medium.

Furthermore, the invention can take the form of a computer program product accessible from a computer-usable or computer-readable medium providing program code of a program for presentation delivery tool 112 for presenting a visual notification and delaying an action responsive to an onscreen selection for use by or in connection with a computing system 800 or any instruction execution system to provide and facilitate the capabilities of the present invention. The aforementioned computer-usable or computer-readable medium or another computer-usable or computer-readable medium may provide program code for control panel generator 110 and/or browser 114. In another embodiment, the aforementioned browser program 114 is replaced or supplemented by a software application whose program code is provided by one of the aforementioned computer-usable or computer-readable media. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 804, ROM, a rigid magnetic disk and an optical disk. Current examples of optical disks include compact disk—read-only memory (CD-ROM), compact disk—read/write (CD-R/W) and DVD.

Any of the components of the present invention can be deployed, managed, serviced, etc. by a service provider that offers to deploy or integrate computing infrastructure with respect to the present invention's process of presenting a visual notification and delaying an action responsive to an onscreen selection. Thus, the present invention discloses a process for supporting computer infrastructure, comprising integrating, hosting, maintaining and deploying computer-readable code into a computing system (e.g., computing unit 102), wherein the code in combination with the computing system is capable of performing a method of presenting a visual notification and delaying an action responsive to an onscreen selection.

In another embodiment, the invention provides a business method that performs the process steps of the invention on a subscription, advertising and/or fee basis. That is, a service provider, such as a Solution Integrator, can offer to create, maintain, support, etc. a process of the present invention that includes presenting a visual notification and delaying an action responsive to an onscreen selection. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Presenting Advertising Content with Delay Time Period

Figure 9:
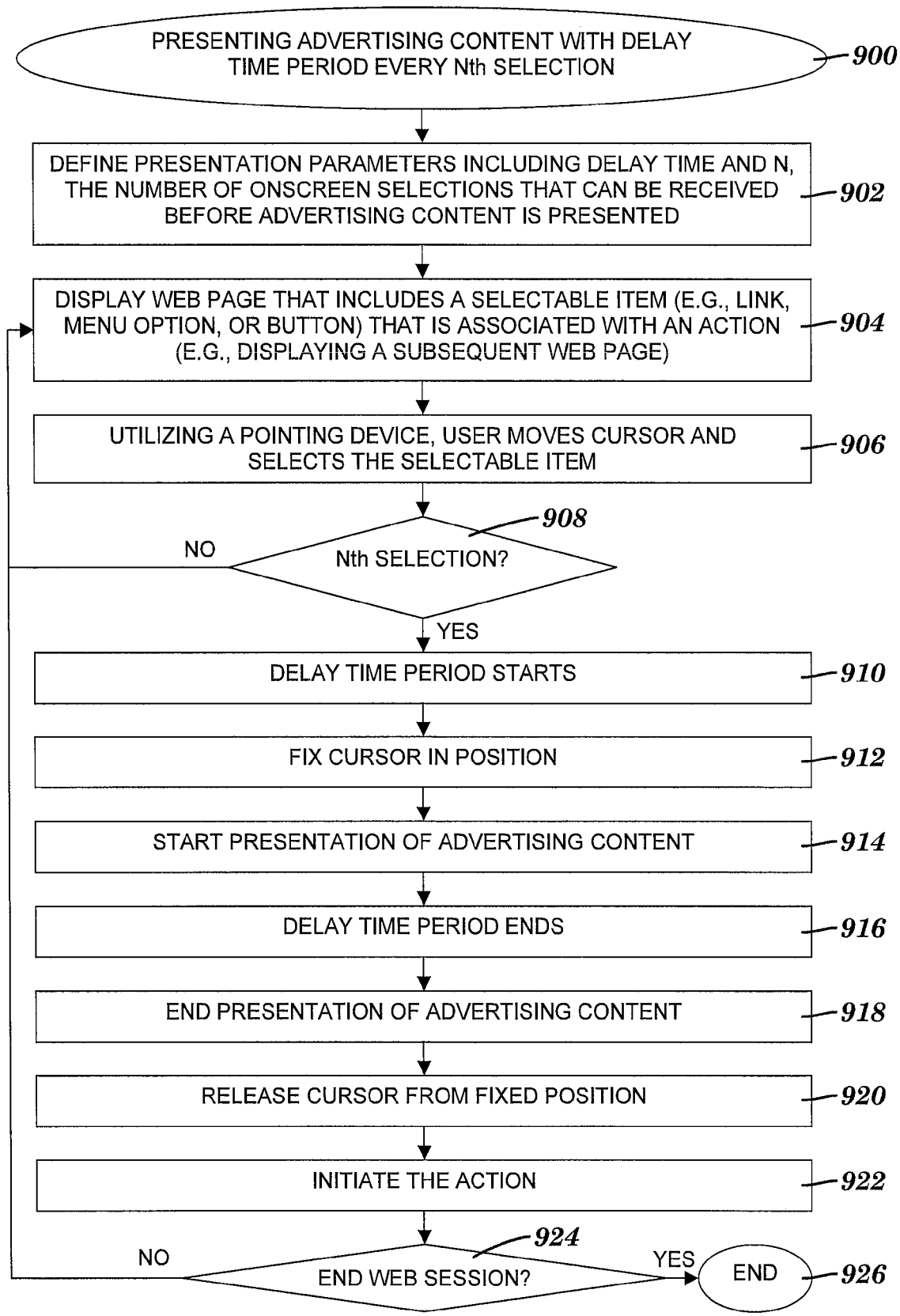
FIG. 9 is a flowchart of a process of presenting advertising content and delaying an action responsive to an onscreen selection on a web page, in accordance with embodiments of the present invention.

FIG. 9 is a flowchart of a process of presenting advertising content and delaying an action responsive to an onscreen selection on a web page, in accordance with embodiments of the present invention. The advertising content presentation process begins at step 900. In step 902, a service provider or administrator utilizes computing unit 102 (see FIG. 1) or another computing unit (not shown) to define presentation parameters that are stored in repository 108 (see FIG. 1). The presentation parameters include a delay time period and N, a number of clicks (i.e., onscreen selections) that are received by computing unit 102 (see FIG. 1) since the beginning of a web session or since the most recent presentation of advertising content before advertising content is presented on display 104 (see FIG. 1). Other presentation parameters such as an audio notification type may also be entered in step 902.

Subsequent to step 902 and prior to step 904, a user initiates a web session on computing unit 102 (see FIG. 1). In this embodiment, computing unit 102 (see FIG. 1) is, for example, a kiosk-based computing system or another computing unit controlled by a facility (e.g., airport, mall, coffee shop, etc.) that offers internet access to patrons of the facility.

In step 904, computing unit 102 (see FIG. 1) displays a web page on display 104 (see FIG. 1) during the web session. The web page includes a selectable item associated with an action such as displaying a subsequent web page. In step 906, utilizing pointing device 106 (see FIG. 1), the user moves a cursor on display 104 (see FIG. 1) and clicks on (i.e., selects) the selectable item included in the web page. The selectable item in step 906 is also referred to in this section as the onscreen selection. Also in step 906, computing unit 102 (see FIG. 1) receives a position of the cursor on display 104 (see FIG. 1) at the time of the onscreen selection.

If presentation delivery tool 112 (see FIG. 1) determines in inquiry step 908 that the selection in step 906 is the N-th selection since the beginning of the web session or since the most recent presentation of advertising content as described below relative to step 914, then the process continues with step 910. Hereinafter, the aforementioned N-th selection since the beginning of the web session or since the most recent presentation of advertising content is referred to simply as the "N-th selection" or the "N-th click."

In step 910, presentation delivery tool 112 (see FIG. 1) starts the pre-defined delay time period in response to the determination in step 908 that the onscreen selection in step 906 is the N-th selection. In step 912, in response to the start of the pre-defined delay time period in step 910, computing unit 102 (see FIG. 1) fixes the cursor at the position received in step 906. If an audio notification type was defined in step 902, then in an additional step (not shown) responsive to step 910, computing unit 102 (see FIG. 1) presents an audio notification to the user of the upcoming presentation of advertising content. In step 914, in response to the start of the pre-defined delay time period in step 910, presentation delivery tool 112 (see FIG. 1) initiates the presentation of advertising content via computing unit 102 (see FIG. 1). The advertising content may include video or static or animated graphic images displayed on display 104 (see FIG. 1) and/or audio content presented via computing unit 102 (see FIG. 1).

In step 916, presentation delivery tool 112 (see FIG. 1) determines a completion of the delay time period. In step 918, in response to determining the completion of the delay time period in step 916, presentation delivery tool 112 (see FIG. 1) end the presentation of the advertising content that began in step 914. In step 920, in response to determining the completion of the delay time period in step 916, computing unit 102 (see FIG. 1) releases the cursor from the position in which the cursor was fixed in step 912 (i.e., allowing the cursor to be moved by pointing device 106 of FIG. 1). In step 922, in response to determining the completion of the delay time period in step 916, computing unit 102 (see FIG. 1) initiates the action associated with the selectable item selected in step 906.

If computing unit 102 (see FIG. 1) determines the end of the user's web session in step 924, then the process of FIG. 9 ends at step 926; otherwise, the process repeats starting at step 904.

Returning to inquiry step 908, if presentation delivery tool 112 (see FIG. 1) determines that the onscreen selection of step 906 is not the N-th selection, then the process repeats starting at step 904.

As one example, a facility (e.g., airport, mall, coffee shop, etc.) offers internet access to patrons of the facility via a kiosk controlled by the facility. The internet access is free to the patrons and is paid for by advertising revenue. The advertising revenue is generated by the advertising content presented according to the process of FIG. 9. In this example, an administrator enters 5 clicks as the value of N and sets the delay time period to 6 seconds in step 902. A patron using the facility's kiosk to access the internet uses a mouse to click 10 times to navigate to web pages 1 through 10, in succession (i.e., the first click is for navigating to web page 1, the second click is for navigating to web page 2, etc.). In response to every fifth click by the user, (i.e., in response to the fifth and tenth clicks), the delay time period starts in step 910, the cursor is fixed in its position in step 912, and a 6-second advertisement is presented to the user in step 914. In response to the 6-second delay time period ending in step 916, the advertisement's presentation ends in step 918, the cursor is released from its fixed position in step 920, and the action of displaying the next web page is initiated in step 922. Thus, after the fifth click, an advertisement is displayed for 6 seconds on the kiosk's display, and in response to determining the end of the 6-second time period, the presentation of the advertisement ends, the cursor is free to be moved again by the user, and web page 5 is displayed.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of presenting a visual notification and delaying an action responsive to an onscreen selection, said method comprising:

a computer system receiving specification of a plurality of presentation parameters that includes a pre-defined delay time period and a type of a visual notification;

said computer system displaying a presentation and a cursor onscreen to an audience, wherein said presentation includes a selectable item, and wherein said presentation is selected from the group consisting of an application page of a software application and a web page of a website;

subsequent to said receiving said specification of said plurality of presentation parameters, said computer system detecting a position of said cursor and a corresponding click selection of said selectable item via a user-input device coupled to said computer system;

responsive to said detecting said click selection, said computer system initiating said pre-defined delay time period, wherein said pre-defined delay time period was defined, via said receiving said specification, prior to said computer system detecting said click selection of said selectable item via said user-input device;

responsive to said initiating said pre-defined delay time period, said computer system presenting said visual notification onscreen to said audience, wherein a result of said presenting said visual notification comprises a detection of said cursor at said position by said audience and an indication to said audience that an action responsive to said click selection is to be executed;

said computer system determining a completion of said pre-defined delay time period; and responsive to said computer system detecting said click selection and responsive to said determining said completion of said pre-defined delay time period, said computer system executing said action.

2. The method of claim 1, wherein said presenting said visual notification further comprises changing an onscreen appearance of said cursor.

3. The method of claim 1, wherein said presenting said visual notification further comprises displaying one or more graphic elements around or substantially close to said cursor.

4. The method of claim 1, further comprising:

responsive to said initiating said pre-defined delay time period, said computer system fixing said cursor in said position; and responsive to said determining said completion of said pre-defined delay time period, said computer system releasing said cursor from being fixed in said position as a result of said fixing.

5. The method of claim 1, wherein said presentation is said web page and wherein said executing said action comprises displaying an update of said web page, a second web page different from said web page, or a document.

6. The method of claim 1, wherein said presentation is said application page of said software application, wherein said executing said action comprises said computer system operating as a standalone computer displaying an update of said application page, a second application page different from said application page, or a document, and wherein said standalone computer operates without a web browser.

7. The method of claim 1, further comprising presenting an audio notification to said audience in response to said initiating said pre-defined delay time period, said presenting said audio notification including indicating that said action is to be executed.

8. The method of claim 1, further comprising changing an onscreen appearance of said selectable item in response to said initiating said pre-defined delay time period, wherein said changing said onscreen appearance of said selectable item comprises facilitating a detection of said selectable item by said audience and indicating that said action responsive to said click selection is to be executed.

9. A computer program product for presenting a visual notification and delaying an action responsive to an onscreen selection, said computer program product comprising:

a computer readable storage medium;

first program instructions to receive specification of a plurality of presentation parameters that includes a pre-defined delay time period and a type of a visual notification;

second program instructions to display a presentation and a cursor onscreen to an audience via a computer system, wherein said presentation includes a selectable item, and wherein said presentation is selected from the group consisting of an application page of a software application and a web page of a website;

third program instructions to detect, subsequent to a receipt of said specification of said plurality of presentation parameters by said first program instructions, a position of said cursor and a corresponding click selection of said selectable item via a user-input device coupled to said computer system;

fourth program instructions to initiate, responsive to a detection of said click selection by said third program instructions, said pre-defined delay time period, wherein said pre-defined delay time period was defined, via said receipt of said specification by said first program instructions, prior to said detection of said click selection of said selectable item via said user-input device by said third program instructions;

fifth program instructions to present, responsive to an initiation of said pre-defined delay time period by said fourth program instructions, said visual notification onscreen to said audience, wherein a result of a presentation of said visual notification by said fifth program instructions comprises a detection of said cursor at said position by said audience and an indication to said audience that an action responsive to said click selection is to be executed;

sixth program instructions to determine a completion of said pre-defined delay time period; and seventh program instructions to execute said action responsive to said detection of said click selection by said third program instructions and responsive to a determination of said completion of said pre-defined delay time period by said sixth program instructions, wherein said first, second, third, fourth, fifth, sixth and seventh program instructions are stored on said computer readable storage medium.

10. The program product of claim 9, wherein said fifth program instructions to present said visual notification include eighth program instructions to change an onscreen appearance of said cursor, wherein said eighth program instructions are stored on said computer readable storage medium.

11. The program product of claim 9, wherein said fifth program instructions to present said visual notification include eighth program instructions to display one or more graphic elements around or substantially close to said cursor, wherein said eighth program instructions are stored on said computer readable storage medium.

12. The program product of claim 9, further comprising:
eighth program instructions to fix, responsive to said initiation of said pre-defined delay time period by said fourth program instructions, said cursor in said position; and
ninth program instructions to release, responsive to said determination of said completion of said pre-defined delay time period by said sixth program instructions, said cursor from being fixed in said position as a result of fixing said cursor by said eighth program instructions,
wherein said eighth and ninth program instructions are stored on said computer readable storage medium.

13. A computer-implemented method of presenting advertising content and delaying an action responsive to an onscreen selection, said method comprising:
a computer system receiving a plurality of pre-defined presentation parameters, said plurality of pre-defined presentation parameters including a delay time period;
said computer system executing an initiation of a web session for a user;
said computer system displaying a first web page to said user as a part of said web session, wherein said first web page includes a first selectable item;
said computer system detecting a first selection of said first selectable item via a pointing device coupled to said computer system;
said computer system determining said first selection is not a selection for initiating a presentation of advertising content during said delay time period, wherein said selection for initiating said presentation of advertising content during said delay time period is selected from the group consisting of a first N-th selection by said user utilizing said pointing device since said initiation of said web session and a second N-th selection by said user utilizing said pointing device since a previous presentation of advertising content within said web session, wherein N is included in said plurality of pre-defined presentation parameters;
responsive to said determining said first selection is not said selection for initiating said presentation of advertising content during said delay time period, said computer system displaying a second web page that includes a second selectable item without initiating said delay time period;
subsequent to said detecting said first selection, subsequent to said determining said first selection is not said selection for initiating said presentation of advertising content during said delay time period, and subsequent to said displaying said second web page without initiating said delay time period, said computer system detecting a position of a cursor and a corresponding second selection of said second selectable item via said pointing device, wherein an action responsive to said second selection is to be executed;
said computer system determining said second selection is said selection for initiating said presentation of advertising content during said delay time period;
responsive to said determining said second selection is said selection for initiating said presentation of advertising content during said delay time period, said computer system initiating said delay time period;
responsive to said initiating said delay time period, said computer system fixing said cursor in said position;
responsive to said initiating said delay time period, said computer system initiating said presentation of advertising content onscreen to said user;
said computer system determining a completion of said delay time period;
responsive to said determining said completion of said delay time period, said computer system ending said presentation of advertising content;
responsive to said determining said completion of said delay time period, said computer system releasing said cursor from being fixed in said position as a result of said fixing; and
responsive to said detecting said second selection and responsive to said determining said completion of said delay time period, said computer system executing said action.

14. A computer program product for presenting advertising content and delaying an action responsive to an onscreen selection, said computer program product comprising:
a computer readable storage medium;
first program instructions to receive a plurality of pre-defined presentation parameters, said plurality of pre-defined presentation parameters including a delay time period;
second program instructions to execute an initiation of a web session for a user;
third program instructions to display a first web page to said user as a part of said web session, wherein said first web page includes a first selectable item;
fourth program instructions to detect a first selection of said first selectable item via a pointing device coupled to said computer system;
fifth program instructions to determine said first selection is not a selection for initiating a presentation of advertising content during said delay time period, wherein said selection for initiating said presentation of advertising content during said delay time period is selected from the group consisting of a first N-th selection by said user utilizing said pointing device since said initiation of said web session and a second N-th selection by said user utilizing said pointing device since a previous presentation of advertising content within said web session, wherein N is included in said plurality of pre-defined presentation parameters;
sixth program instructions to display, without initiating said delay time period and responsive to a determination that said first selection is not said N-th selection for initiating said presentation of advertising content during said delay time period by said fifth program instructions, a second web page that includes a second selectable item;

seventh program instructions to detect, subsequent to a detection of said first selection by said fourth program instructions, subsequent to said determination that said first selection is not said N-th selection for initiating said presentation of advertising content during said delay time period by said fifth program instructions, and subsequent to a display of said second web page without initiating said delay time period by said sixth program instructions, a position of a cursor and a corresponding second selection of said second selectable item via said pointing device, wherein an action responsive to said second selection is to be executed;

eighth program instructions to determine said second selection is said N-th selection for initiating said presentation of advertising content during said delay time period;

ninth program instructions to initiate, responsive to a determination that said second selection is said N-th selection for initiating said presentation of advertising content during said delay time period by said eighth program instructions, said delay time period;

tenth program instructions to fix, responsive to an initiation of said delay time period by said ninth program instructions, said cursor in said position;

eleventh program instructions to initiate, responsive to said initiation of said delay time period by said ninth program instructions, said presentation of advertising content onscreen to said user;

twelfth program instructions to determine a completion of said delay time period;

thirteenth program instructions to end, responsive to a determination of said completion of said delay time period by said twelfth program instructions, said presentation of advertising content;

fourteenth program instructions to release, responsive to said determination of said completion of said delay time period by said twelfth program instructions, said cursor from being fixed in said position as a result of fixing said cursor in said position by said tenth program instructions; and fifteenth program instructions to execute, responsive to a detection of said second selection by said seventh program instructions and responsive to said determination of said completion of said delay time period by said twelfth program instructions, said action, wherein said first through fifteenth program instructions are stored on said computer readable storage medium.

15. The method of claim 1, wherein said detecting said click selection of said selectable item via said user-input device includes said computer system receiving said click selection from a presenter who controls said user-input device and who presents said presentation to said audience by controlling said user-input device, wherein said audience includes multiple participants viewing said presentation, and wherein said presenter is different from said audience.

16. The method of claim 15, wherein said initiating said pre-defined delay time period includes initiating said pre-defined delay time period as defined by said presenter who presents said presentation to said audience by controlling said user-input device.

17. The method of claim 3, wherein said displaying said one or more graphic elements around or substantially close to said cursor includes displaying a series of rings centered around a pre-specified point of said cursor, wherein said rings have decreasing diameter sizes in said series, and wherein said displaying said series of rings includes displaying said rings one ring at a time to depict a convergence towards said cursor.

18. The program product of claim 9, wherein said third program instructions to detect said click selection of said selectable item via said user-input device includes eighth program instructions to receive said click selection from a presenter who controls said user-input device and who presents said presentation to said audience by controlling said user-input device, wherein said audience includes multiple participants viewing said presentation, wherein said presenter is different from said audience, and wherein said eighth program instructions are stored on said computer readable storage medium.

19. The program product of claim 18, wherein said fourth program instructions to initiate said pre-defined delay time period includes eighth program instructions to initiate said pre-defined delay time period as defined by said presenter who presents said presentation to said audience by controlling said user-input device, and wherein said eighth program instructions are stored on said computer readable storage medium.

20. The program product of claim 11, wherein said eighth program instructions to display said one or more graphic elements around or substantially close to said cursor include ninth program instructions to display a series of rings centered around a pre-specified point of said cursor, wherein said rings have decreasing diameter sizes in said series, wherein a display of said series of rings by said ninth program instructions includes a display of said rings one ring at a time to depict a convergence towards said cursor, and wherein said ninth program instructions are stored on said computer readable storage medium.

* * * * *